(12) United States Patent
Gerhardt et al.

(10) Patent No.: US 10,272,952 B2
(45) Date of Patent: Apr. 30, 2019

(54) MOTOR VEHICLE HAVING AN ASYMMETRIC STRUCTURE

(71) Applicant: FORD GLOBAL TECHNOLOGIES, LLC, Dearborn, MI (US)

(72) Inventors: Torsten Gerhardt, London (GB); Nir Siegel, Herzeliya (IL)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/816,339

(22) Filed: Nov. 17, 2017

(65) Prior Publication Data

US 2018/0134317 A1    May 17, 2018

(30) Foreign Application Priority Data

Nov. 17, 2016  (GB) .................................. 1619431.8

(51) Int. Cl.
  *B62D 25/06*  (2006.01)
  *B62D 21/15*  (2006.01)
  *B62D 21/02*  (2006.01)
  *B62D 25/04*  (2006.01)
  *B60J 5/04*   (2006.01)
  *B60R 19/34*  (2006.01)
  (Continued)

(52) U.S. Cl.
  CPC .............. *B62D 25/06* (2013.01); *B60J 1/002* (2013.01); *B60J 5/0426* (2013.01); *B60J 5/0473* (2013.01); *B60R 19/34* (2013.01); *B62D 21/02* (2013.01); *B62D 21/15* (2013.01); *B62D 25/04* (2013.01); *B62D 25/08* (2013.01); *B62D 31/00* (2013.01); *B62D 33/0617* (2013.01); *E02F 9/163* (2013.01)

(58) Field of Classification Search
  CPC .......... B62D 25/06; B62D 31/00; B60J 1/002; B60J 1/004; B60J 1/003
  USPC ........ 296/210, 103, 218, 96.12, 96.21, 84.1, 296/146.9; 49/41, 49; D12/86
  See application file for complete search history.

(56) References Cited

U.S. PATENT DOCUMENTS

| 4,120,375 A | 10/1978 | Shinoda et al. |
| 4,823,905 A | 4/1989 | Piech |
| (Continued) |

FOREIGN PATENT DOCUMENTS

| CN | 203294197 U | 11/2013 |
| CN | 204488970 U | 7/2015 |
| (Continued) |

OTHER PUBLICATIONS

Peel Engineering Ltd., Peel P50 User Manual, http://www.peelengineering.com/sites/default/files/Maunal_P50.pdf, 12 pages, 7 Pages Only.

(Continued)

*Primary Examiner* — Dennis H Pedder
(74) *Attorney, Agent, or Firm* — Vichit Chea; Brooks Kushman P.C.

(57) ABSTRACT

A motor vehicle is disclosed having A-pillars and B-pillars on a first side of the motor vehicle and a B-pillar but no 'A' pillar on a second side of the motor vehicle. A wrap around window extends from the A-pillar on the first side of the motor vehicle substantially without interruption to the B-pillar on the second side of the motor vehicle. The wrap around window forms part of a top hinged door that provides access to a passenger compartment when in an open state.

22 Claims, 11 Drawing Sheets

(51) Int. Cl.
  *B62D 25/08* (2006.01)
  *B62D 31/00* (2006.01)
  *B60J 1/00* (2006.01)
  *B62D 33/06* (2006.01)
  *E02F 9/16* (2006.01)

(56) References Cited

U.S. PATENT DOCUMENTS

| | | | |
|---|---|---|---|
| 5,080,428 A * | 1/1992 | Rouland | B60J 7/145 |
| | | | 16/382 |
| 8,007,032 B1 | 8/2011 | Craig | |
| D649,909 S * | 12/2011 | Mullen | D12/86 |
| 2007/0108803 A1 | 5/2007 | Chen et al. | |
| 2011/0012390 A1 | 1/2011 | Baumann | |
| 2011/0023373 A1 | 2/2011 | Yasuhara et al. | |
| 2012/0037441 A1 | 2/2012 | Frohnmayer et al. | |
| 2012/0169090 A1* | 7/2012 | Verhee | B62D 25/06 |
| | | | 296/215 |
| 2013/0140851 A1 | 6/2013 | Zornack et al. | |
| 2014/0346816 A1 | 11/2014 | Craig et al. | |

FOREIGN PATENT DOCUMENTS

| | | |
|---|---|---|
| CN | 105365729 A | 3/2016 |
| CN | 205273621 U | 6/2016 |
| DE | 102010020312 A1 | 11/2011 |
| DE | 202015004988 U1 | 11/2015 |
| EP | 0686543 A1 | 12/1995 |
| GB | 2457034 | 5/2009 |
| JP | S59202931 A | 11/1984 |
| JP | 2002250052 A | 9/2002 |
| JP | 2006015985 A | 1/2006 |
| JP | 2009046107 A | 3/2009 |
| WO | 2005118377 A1 | 12/2005 |

OTHER PUBLICATIONS

Volkswagen, Nils, https://web.archive.org/web/20130303010805/ http://www.volkswagen.co.uk/about-us/futures/nils, 2013, 3 pages.

* cited by examiner

MOTOR VEHICLE HAVING AN ASYMMETRIC STRUCTURE

CROSS-REFERENCE TO RELATED APPLICATIONS

This application claims foreign priority benefits under 35 U.S.C. § 119(a)-(d) to GB Application 1 619 431.8 filed Nov. 17, 2016, which is hereby incorporated by reference in its entirety.

TECHNICAL FIELD

This disclosure relates to motor vehicles and in particular to a motor vehicle having an asymmetric structure.

BACKGROUND

The crash requirements for M1 homologated vehicles (passenger cars) are highly evolved around the shape of existing cars and car design has evolved to meet existing safety legislation.

When a non-conventional car design is proposed it brings problems due to the need to meet current requirements that are designed for conventional vehicle designs.

For example, a standard 40% offset crash requirements when applied to a sub-one meter wide car (such as a 0.8 m wide car) means in the case of a vehicle having two front crash rails:
1) the vehicle will only overlap by 320 mm with the barrier;
2) the main crash rail needs to be within this 320 mm wide zone;
3) space is required outboard of the main crash rail for the wheel and the complete tire envelope when the wheel turns;
4) a wheel envelope for a narrow tire of 0.130 m width and an overall diameter of 0.56 m requires approximately 0.3 m (assuming a 40 degree wheel turn angle);
5) the rail will only overlap the barrier by approximately 0.020 m and a rail of 0.02 m width is not suitable to meet crash requirements;
6) there is only 0.08 m from the edge of the barrier to the centerline of the vehicle; and
7) the maximum width for both crash rails together including any gap in between, is therefore 0.2 m.

The strategy of using two symmetrical crash rails in parallel will not work for such a narrow vehicle and a single crash device (a crash can unit) located on a centerline of the vehicle is all that can sensibly be packaged.

A second problem is that such a narrow car must still meet forward field of view regulations but the A-pillar structures conventionally used at the front of a vehicle take up a much bigger proportion of the front area in the case of such a narrow vehicle thereby resulting in a disproportionately small front windscreen opening.

The smaller the car, the bigger proportion of the total weight that is allocated to features that cannot be scaled such as the doors. The weight of a door that allows an occupant to exit in comfort, is safe, and includes the same features as the door of a large car is problematic for a small car. A narrow sub-one meter small car is too narrow to seat two occupants side-by-side and although providing a door on both sides is convenient, it is not necessary. The removal of one of the doors will at least partially address the weight allocation problem.

SUMMARY

It is one object of this disclosure to provide a vehicle structure suitable for use on a small narrow vehicle where only a single entry door is required. It is a another object of this disclosure to provide a motor vehicle using such an asymmetric vehicle structure.

According to a first aspect of the invention there is provided a motor vehicle structure having a roof structure connected to a main vehicle structure by a number of upwardly extending pillars wherein on a first side of the vehicle structure there is an A-pillar connecting a front end of the roof structure to the main vehicle structure and a B-pillar connecting the roof structure to the main vehicle structure to the rear of the A-pillar and on a second side of the vehicle structure there is a B-pillar connecting the roof structure to the main vehicle structure but no A-pillar connecting the roof structure to the main vehicle structure.

The roof structure may include a diagonal roof member connected at one end to an upper end of the A-pillar on the first side of the vehicle structure and connected at an opposite end to an upper end of the B-pillar on the second side of the vehicle structure.

The roof structure may include an upper longitudinally extending roof member connected at a front end to an upper end of the A-pillar on the first side of the vehicle structure and connected towards a rear end to an upper end of the B-pillar on the first side of the vehicle structure.

The roof structure may include a transversely extending roof member connected at one end to an upper end of the B-pillar on the first side of the vehicle structure and connected at an opposite end to an upper end of the B-pillar on the second side of the vehicle structure.

The roof structure may comprise the diagonal roof member, the upper longitudinally extending roof member, and the transversely extending roof member connected together to form a structurally rigid triangle.

The main vehicle structure may include a front structure. The front structure may include a single front crush can unit mounted centrally at a front end of the front structure.

The A-pillar on the first side of the vehicle structure may be connected at a lower end to the front structure of the vehicle structure.

The main vehicle structure may include a rear structure. The B-pillars on the first and second sides of the vehicle structure may form parts of the rear structure.

The front and rear structures may be joined together by at least one longitudinal side member on each side of the vehicle structure.

On the first side of the vehicle structure there may be an intermediate longitudinal side member connected at one end to part of the front structure and connected at a rear end to the B-pillar on the first side of the vehicle structure. A lower longitudinal side member may be connected at one end to part of the front structure and connected at a rear end to the B-pillar on the first side of the vehicle structure.

On the second side of the vehicle structure there may be a lower longitudinal side member connected at one end to part of the front structure and connected at a rear end to the B-pillar on the second side of the vehicle structure but without an intermediate longitudinal side member.

Alternatively, on the first side of the vehicle structure a lower longitudinal side member may be connected at one end to part of the front structure and connected at a rear end to the B-pillar on the first side of the vehicle structure but without an intermediate longitudinal side member.

An intermediate longitudinal side member may be connected on the second side of the vehicle structure at one end to part of the front structure and connected at a rear end to the B-pillar on the second side of the vehicle structure. A lower longitudinal side member may be connected at one end to part of the front structure and connected at a rear end to the B-pillar on the second side of the vehicle structure.

According to a second aspect of this disclosure, a motor vehicle having a vehicle structure constructed in accordance with said first aspect of the invention is provided in which the first side of the vehicle structure is on a first side of the motor vehicle and the second side of the vehicle structure is on a second side of the motor vehicle. A narrow motor vehicle is provided that accommodates no more than one person per row of seating and has a single entry door on one of the first and second sides and no door on an opposite one of the first and second sides.

The single entry door may be a top hinged door located on the second side of the motor vehicle.

The roof structure may include a diagonal roof member connected at one end to an upper end of the A-pillar on the first side of the vehicle structure and connected at a distal end to an upper end of the B-pillar on the second side of the vehicle structure and the top hinged door may be hingedly connected along one edge to the diagonal roof member for rotation about a substantially horizontal pivot axis.

The top hinged door may include a lower structural part and the lower structural part of the top hinged door may include an elongate door beam to transfer, when the top hinged door is in a closed state, impact loads applied to the elongate door beam into the main vehicle structure.

The top hinged door may include a wrap around window that extends when the door is in a closed state from a position adjacent the A-pillar on the first side of the motor vehicle to a position substantially adjacent the B-pillar on the second side of the motor vehicle.

The wrap around window may be fastened along a top edge to a wedge shaped roof hingedly connected along one edge to the diagonal roof member.

Alternatively, the top hinged door may include a wrap around window that extends when the door is in a closed state from a position adjacent the A-pillar on the first side of the motor vehicle to a position substantially adjacent the B-pillar on the second side of the motor vehicle and onto the top of the motor vehicle to a position adjacent the diagonal roof member to which the top hinge door is hingedly connected.

As an alternative to the foregoing, the single entry door may be a side hinged door hingedly connected at one edge to the main vehicle structure for rotation about a substantially vertical pivot axis on the first side of the motor vehicle.

A lower structural part of the side hinged door may include an elongate door beam to transfer, when the side hinged door is in a closed state, impact loads applied to the elongate door beam of the side hinged door into the main vehicle structure.

The motor vehicle may include a fixed wrap around window sealingly secured at one end to the A-pillar on the first side of the motor vehicle and sealingly secured at an opposite end to one of an upright window frame positioned adjacent the B-pillar on the second side of the motor vehicle and the B-pillar on the second side of the motor vehicle.

An upper edge of the wrap around window may be sealingly secured to part of a roof structure of the motor vehicle and a lower edge of the wrap around window may be sealingly secured to structural members defining a lower edge of a window aperture in which the wrap around window is sealingly secured.

This disclosure will now be described by way of example with reference to the accompanying drawing.

DETAILED DESCRIPTION

Figure 1:
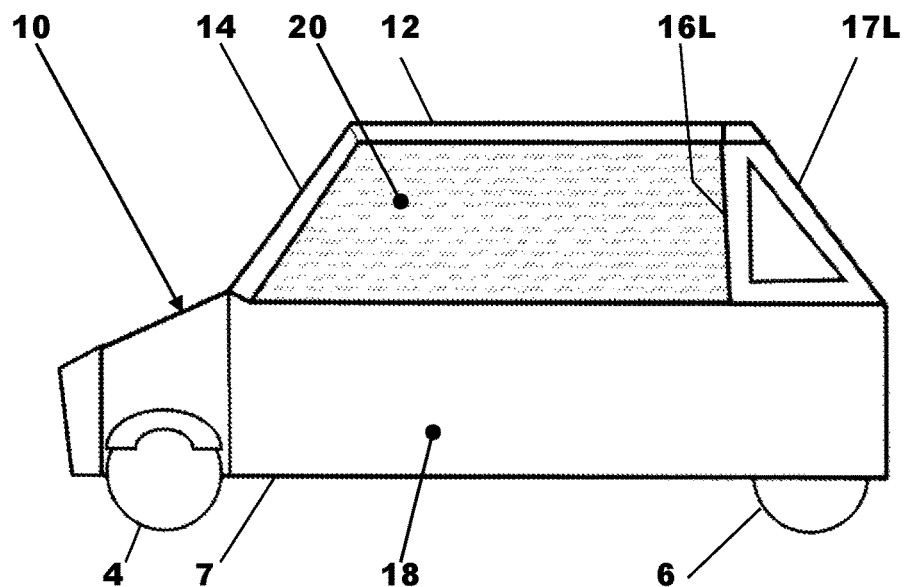
FIG. 1 is a schematic left hand side view of a first embodiment of a narrow motor vehicle in accordance with the invention.
Figure 2:
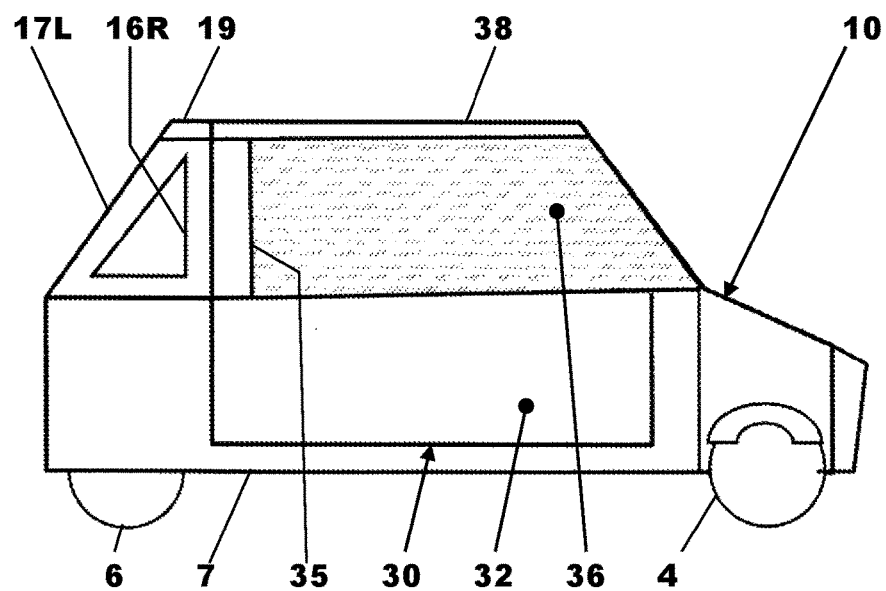
FIG. 2 is a schematic right hand side view of the narrow motor vehicle shown in FIG. 1.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 1 to 10, a narrow motor vehicle 10 is illustrated. A narrow motor vehicle as referred to herein is a motor vehicle accommodating no more than one person per row of seating. It will be appreciated that there could be more than one row of seating arranged in tandem fashion although the motor vehicle shown is intended to only accommodate a single occupant. Typically, a narrow vehicle has a total overall width of less than one meter and advantageously a width of about 0.8 m.

The motor vehicle 10 has a floor 7 and a roof 12 connected to a lower main part of the motor vehicle 10 including the floor 7 by a number of upwardly extending pillars 14, 16L, 16R, 17L, 17R forming part of a vehicle structure 50 of the motor vehicle 10. The upwardly extending pillars comprise a single A-pillar 14, a pair of B-pillars 16L, 16R and a pair of C-pillars 17L, 17R.

The motor vehicle 10 has no door on a first side of the motor vehicle 10 only a continuous lower body panel 18 but has a single entry door. In this embodiment, the single entry door is a top hinged door 30 located on a second side of the motor vehicle 10. A fixed side window 20 is sealingly secured along its periphery to the A-pillar 14, the roof 12, the B-pillar 16L and the lower body panel 18. Although not shown, the fixed side window 20 includes a small openable portion to allow the driver to access the outside of the motor vehicle 10 for the purpose of paying for parking fees or for taking a ticket from a parking machine.

The first side of the motor vehicle 10 is a left hand side and the second side of the motor vehicle 10 is a right hand side. Alternatively, the first side of the motor vehicle 10 could be the right hand side and the second side of the motor vehicle 10 could be the left hand side.

The first side of the motor vehicle 10 is the side of the motor vehicle 10 that includes the single A-pillar 14.

Figure 10:
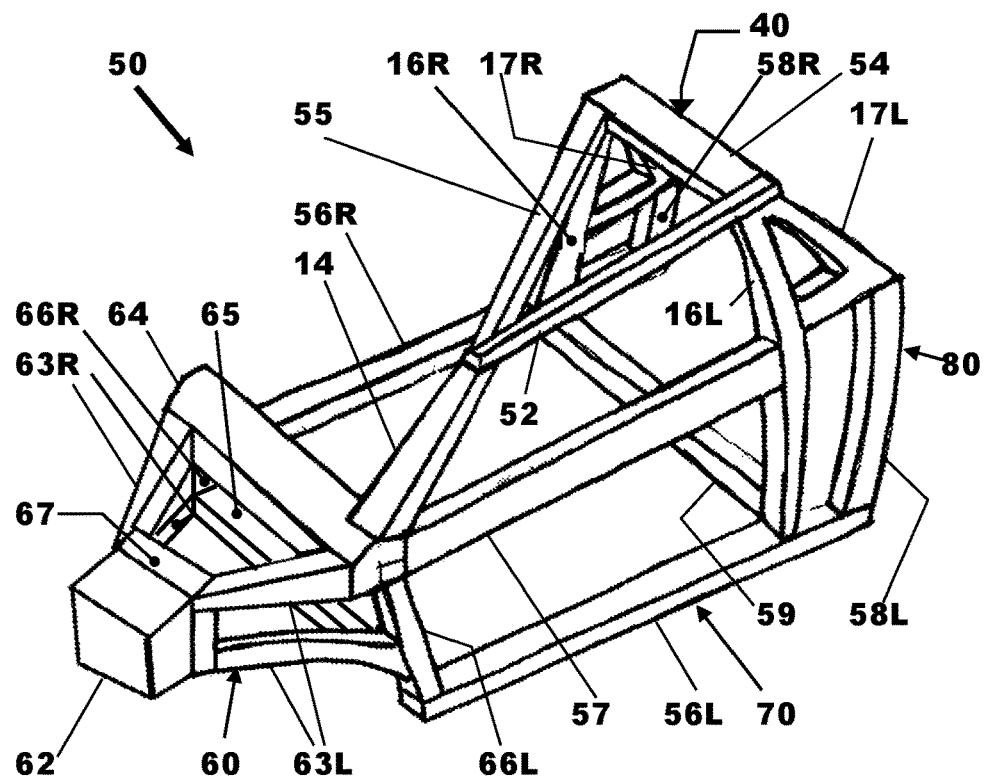
FIG. 10 is a left hand side pictorial view of a vehicle structure for the vehicle shown in FIGS. 1 to 8.
Figure 11:
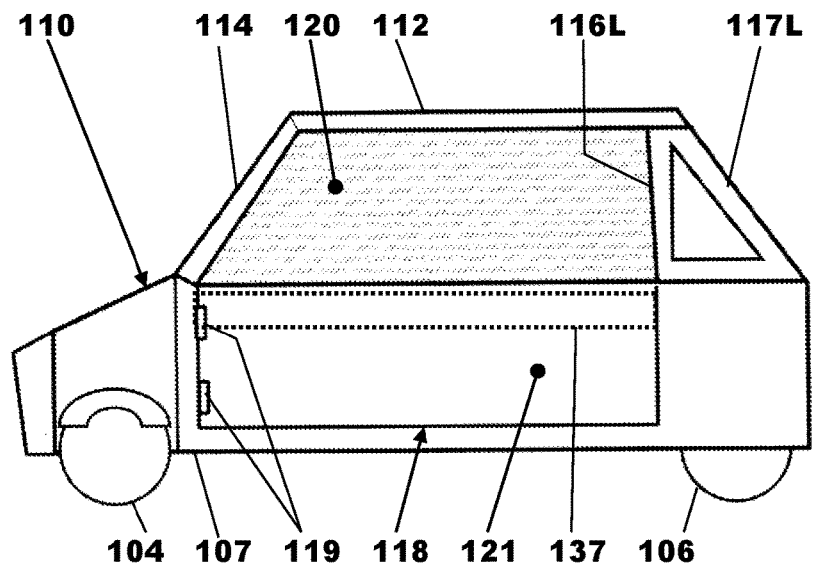
FIG. 11 is a schematic left hand side view of a second embodiment of a narrow motor vehicle in accordance with the invention.
Figure 12:
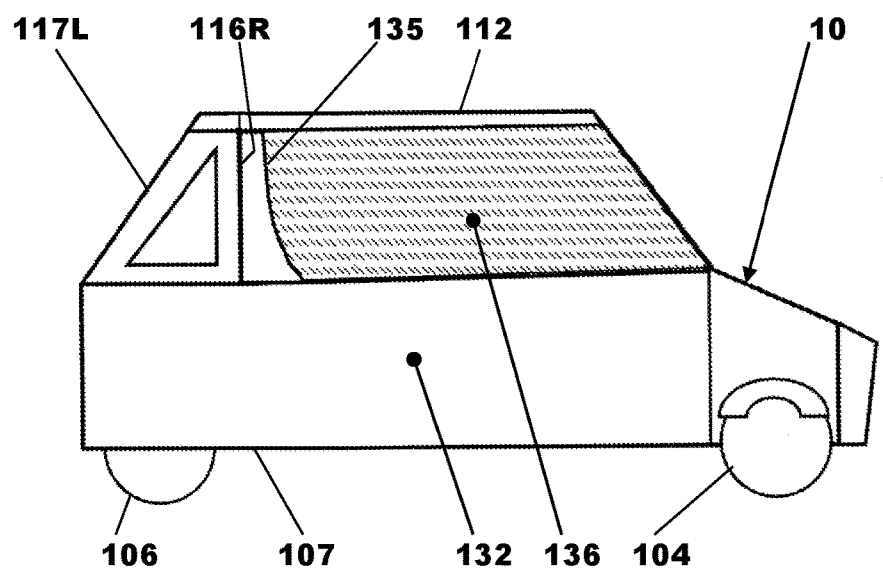
FIG. 12 is a schematic right hand side view of the narrow motor vehicle shown in FIG. 11.

With particular reference to FIG. 10, on a first side of the vehicle structure 50 that corresponds to the first side of the motor vehicle 10, the single A-pillar 14 connects a front end of a roof structure 40 and underlies the roof 12 of the motor vehicle 10 to a main vehicle structure 70. A first B-pillar 16L connects the roof structure 40 to the main vehicle structure 70 to the rear of the A-pillar 14. On a second side of the vehicle structure 50 that corresponds to the second side of the motor vehicle 10, a second B-pillar 16R connects the roof structure 40 to the main vehicle structure 70 but no A-pillar connects the roof structure 40 to the main vehicle structure 70.

The main vehicle structure 70 includes a front structure 60 connected to a rear structure 80 by at least one longitudinally extending structural member on each side of the vehicle structure 50. Lower longitudinally extending structural side members 56L; 56R are provided on both sides of the motor vehicle 10. On the first side of the vehicle structure 50 an intermediate longitudinally extending structural side member 57 is located near a waistline of the motor vehicle 10 and is connected at one end to part of the front structure 60. A transversely extending upper structural member 64 is connected at a rear end to the B-pillar 16L on the first side of the vehicle structure 50. A lower longitudinally extending structural side member 56L is connected at one end to part of the front structure 60 in the form of an upright structural member 66L and is connected at a rear end to the B-pillar 16L on the first side of the vehicle structure 50.

On the second side of the vehicle structure 50, a lower longitudinally extending structural side member 56R is connected at one end to part of the front structure 60 in the form of a second upright structural member 66R and is connected at a rear end to the B-pillar 16R on the second side of the vehicle structure 50. There is no intermediate longitudinally extending structural side member as this function is performed by a structural member 37 forming part of the top hinged door 30.

The rear structure 80 is formed in the case of this example by the pair of B-pillars 16L, 16R, the pair of C-pillars 17L, 17R a pair of rear uprights 58L, 58R and a transverse lower beam 59.

The front structure 60 has at least one deformable member and in the case of this example comprises a front crush can unit 62 to absorb low speed impacts mounted on a low speed crash can carrier 67. The front structure also includes a pair of diagonally extending upper and lower front rails 63L, 63R on each side of the vehicle structure 50, the transverse upper structural member 64, a transverse lower member 65 and the pair of structural uprights 66L, 66R located on each side of the vehicle structure 50.

Each of the lower rails of the pair of diagonally extending rails 63L and 63R is connected at a front end to the low speed crash can carrier 67 to support a respective side of the crush can unit 62.

The upper rails of the pair of rails 63L, 63R connect the low speed crash can carrier 67 to the transverse upper structural member 64. The lower rails of the pair of rails 63L, 63R connect the crush can unit 62 to a respective one of the pair of structural uprights 66L, 66R. The single front crush can unit 62 is mounted centrally at a front end of the front structure 60 so as to occupy less space and permit turning of the front wheels. The crush can unit 62 transfers load applied to it via the left hand and right hand pairs of upper and lower rails 63L and 63R to the main vehicle structure 70 of the vehicle structure 50.

The roof structure 40 includes a diagonal roof member 55 connected at one end to an upper end of the A-pillar 14 on the first side of the vehicle structure 50 and connected at a distal end to an upper end of the B-pillar 16R on the second side of the vehicle structure 50. The A-pillar 14 is connected at a lower end to the front structure 60 of the vehicle in the form of the transverse upper structural member 64. The roof structure 40 also includes an upper longitudinally extending roof member 52 (header rail) connected at a front end to an upper end of the A-pillar 14 and connected towards a rear end to an upper end of the B-pillar 16L on the first side of the vehicle structure 50. A transverse structural member in the form of a transversely extending roof member 54 is connected at one end to upper ends of the B-pillar 16L and the C-pillar 17L on the first side of the vehicle structure 50. The transverse structural member is connected at a distal end to upper ends of the B-pillar 16R and the C-pillar 17R on the second side of the vehicle structure 50. It will be noted that there is no upper longitudinally extending roof member (header rail) on the second side of the vehicle structure 50 because there is no A-pillar on that side of the vehicle structure 50 to connect it to at a forward end.

The roof structure 40 comprises the diagonal roof member 55, the upper longitudinally extending roof member 52 and the transversely extending roof member 54 connected together to form a structurally rigid triangle.

Frontal impact loads are initially absorbed by the crush can unit 62 and are then transferred via the pairs of upper and lower rails 63L, 63R to the transverse upper structural member 64 and the pair of structural uprights 66L, 66R respectively. In the case of a severe frontal impact the pairs of upper and lower rails 63L, 63R are designed to collapse in a controlled manner so as to absorb impact energy.

The triangular roof structure 40 comprised of the longitudinally extending roof member 52, the transversely extending roof member 54 and the diagonal roof member 55. The triangular roof structure 40 forms a strong structural unit able to withstand significant applied loads and to effectively transfer load from the front structure 60 via the A-pillar 14 to the rear structure 80 in such a manner as to make a second A-pillar structurally redundant.

Referring now to FIGS. 1 to 9, a lower structural part 32 of the top hinged door 30 includes an elongate door beam 37 extending between and operatively connected when the top hinged door 30 is in a closed state to the front and rear structures 60 and 80. Side impact loads are transferred directly to the door beam 37 of the top hinged door 30. Front impact loads are applied via the front structure 60 to the door beam 37 into the main vehicle structure 70. The elongate door beam 37 co-operates at a rear end with the B-pillar 16R on the second side of the motor vehicle 10 and at a front end with the transversely extending upper structural member 64 of the front structure 60.

Figure 5:
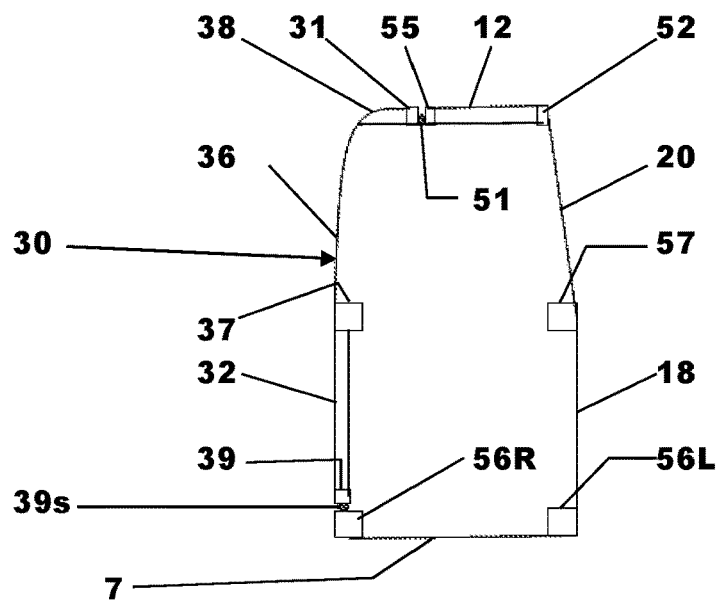
FIG. 5 is an outline cross-section along the line A-A on FIG. 3.
Figure 6:
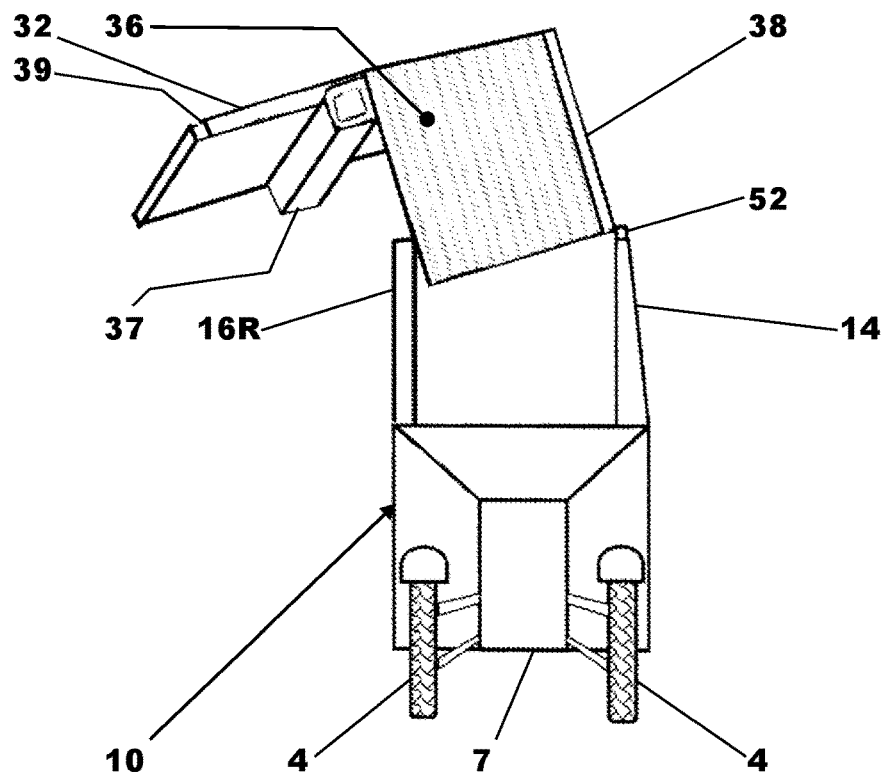
FIG. 6 is a schematic front view of the narrow motor vehicle shown in FIGS. 1 to 3 but showing a top hinged door of the motor vehicle in an open state.

A side rail 39 of the top hinged door 30 is arranged, when the top hinged door 30 is in the closed state (as shown in FIG. 5) to co-operate with a seal 39s fixed to the lower side member 56R of the vehicle structure 50. The side rail 39 extends between and is operatively connected, when the top hinged door 30 is in the closed state, to the front and rear structures 60 and 80.

It will be appreciated that the connections between the door beam 37 and the side rail 39 and the front and rear structures 60 and 80 are only made when the top hinged door 30 is in the closed state and do not prevent or hinder movement of the top hinged door 30 to an open state.

The top hinged door 30 includes a wrap around window 36 that extends, when the top hinged door 30 door is in the closed state from a position close to the A-pillar 14 on the first side of the motor vehicle 10 to a position close to the B-pillar 16R on the second side of the motor vehicle 10.

In some embodiments, the wrap around window 36 may have no upwardly extending frame members and so will extend without interruption so as to lie at one end adjacent to the A-pillar on the first side of the motor vehicle 10 and lie at an opposite end adjacent to the B-pillar 16R on the second side of the motor vehicle 10. However, in the case of the example shown, a door rear upper frame member 35 is provided and so in such a case there is a gap between the end of the wrap around window 36 and the actual B-pillar 16R on the second side of the motor vehicle 10. The wrap around window 36 is fastened along a top edge to a wedge shaped roof 38 that is hingedly connected along one edge to the diagonal roof member 55 of the vehicle structure by a hinge assembly 51. It will be appreciated that the wrap around window 36 includes a windscreen area and a side window area.

Figure 3:
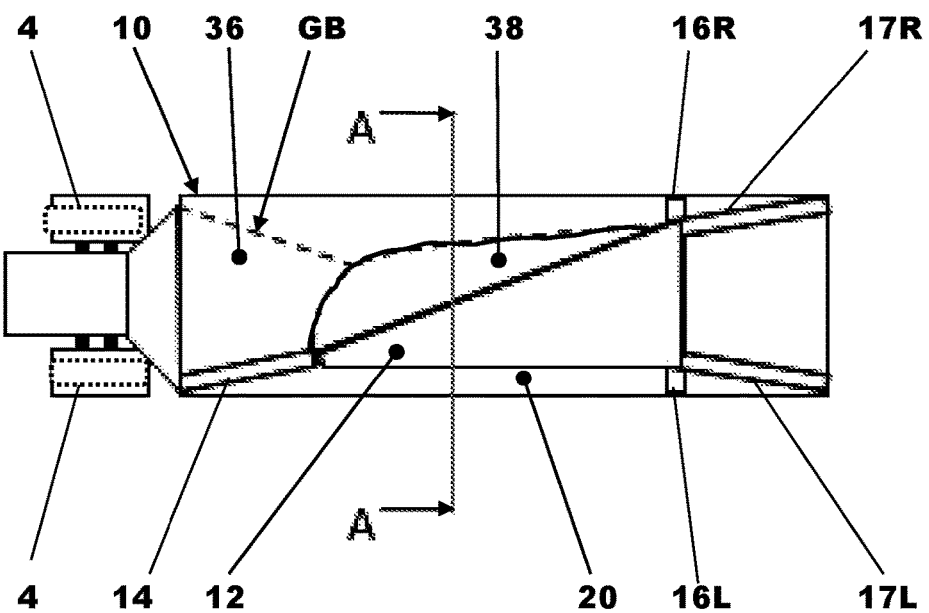
FIG. 3 is a schematic plan view of the narrow motor vehicle shown in FIGS. 1 and 2.
Figure 4:
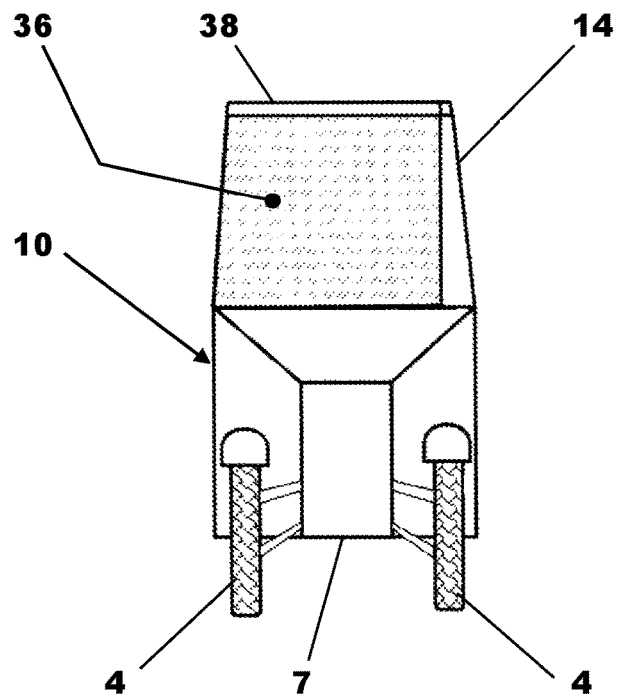
FIG. 4 is a schematic front view of the narrow motor vehicle shown in FIGS. 1 to 3.
Figure 7:
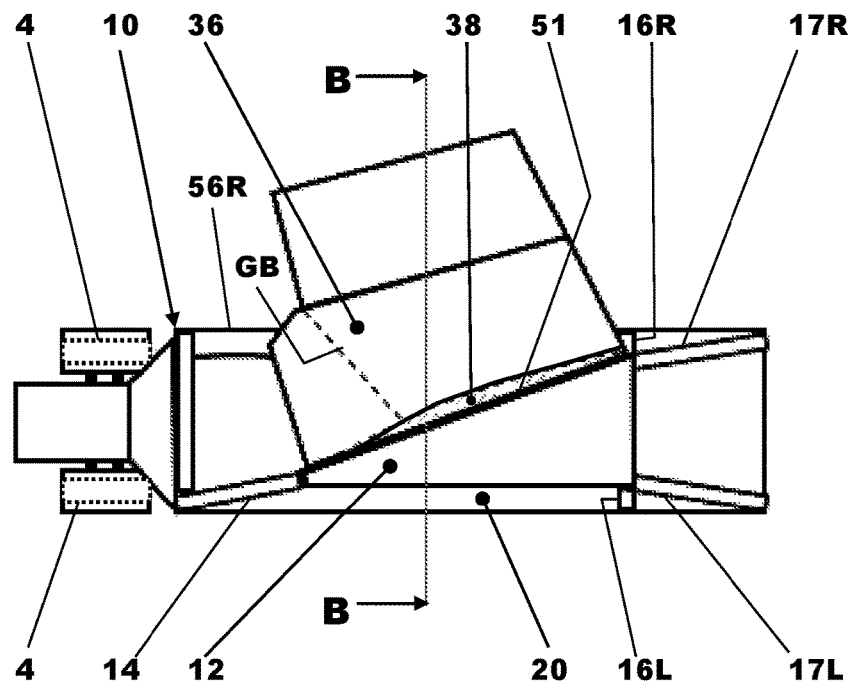
FIG. 7 is a schematic plan view of the narrow motor vehicle shown in FIG. 6.
Figure 8:
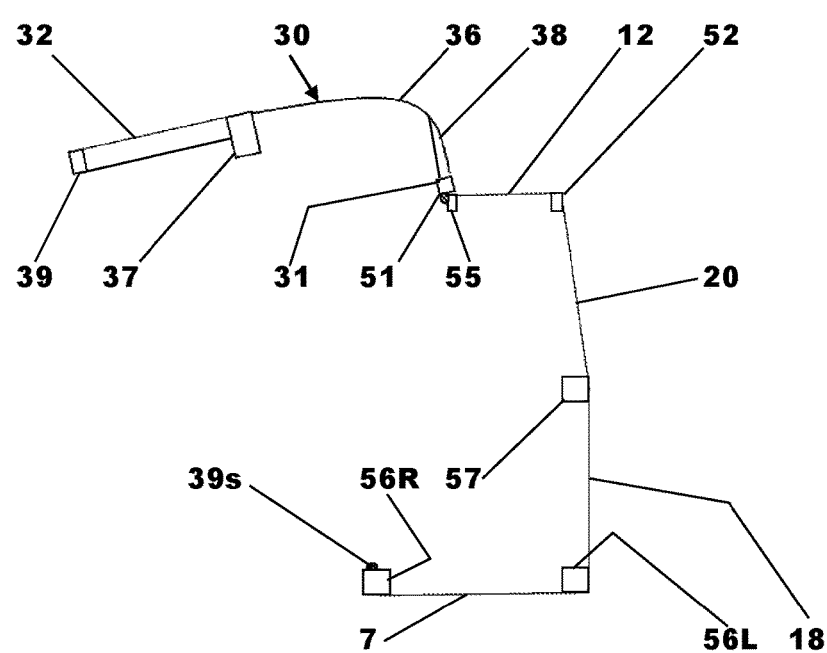
FIG. 8 is an outline cross-section along the line B-B on FIG. 7.

As shown in FIGS. 3 and 7 by a broken line 'GB' a non-structural glazing strip can be used in some embodiments to join two pieces of glass so as to form the wrap around window 36 if the shape of the wrap around window 36 precludes it being made as a single component.

The wedge shaped roof 38 includes a structural member 31 that is used to connect the wedge shaped roof 38 of the top hinge door 30 to the hinge assembly 51. The top hinged door 30 is hingedly connected by the hinge assembly 51 for rotation about a substantially horizontal pivot axis between the closed state shown in FIGS. 2 to 5 and an open state shown in FIGS. 6 to 8. It will be appreciated that the pivot axis is not arranged to lie on a centerline of the motor vehicle 10 but rather is inclined to the longitudinal centerline of the motor vehicle 10 so as to be spaced further away from the second side of the motor vehicle 10 at a front end of the top hinged door 30 than it is at a rear end of the top hinged door 30.

Figure 9:
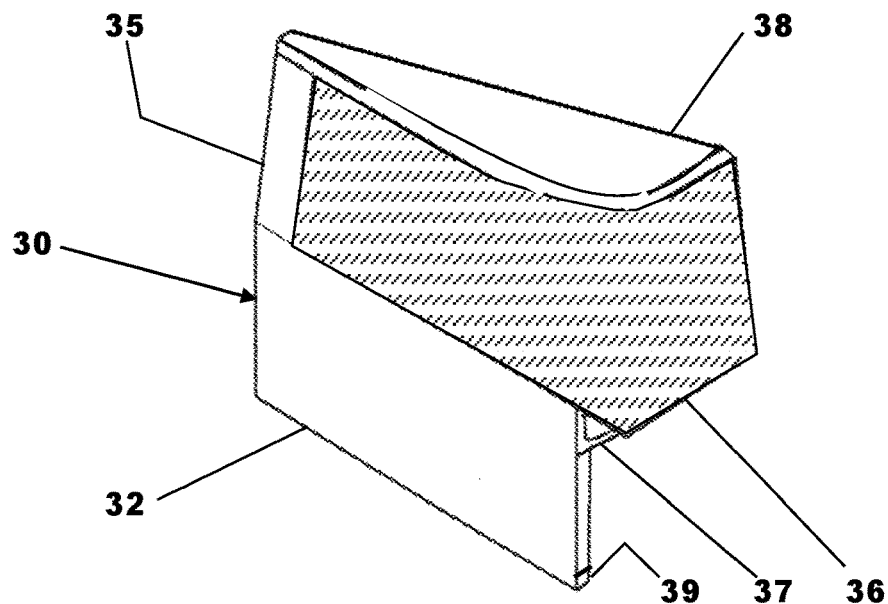
FIG. 9 is a right hand side pictorial view of the top hinged door forming part of the motor vehicle shown in FIGS. 1 to 8.
Figure 19A:
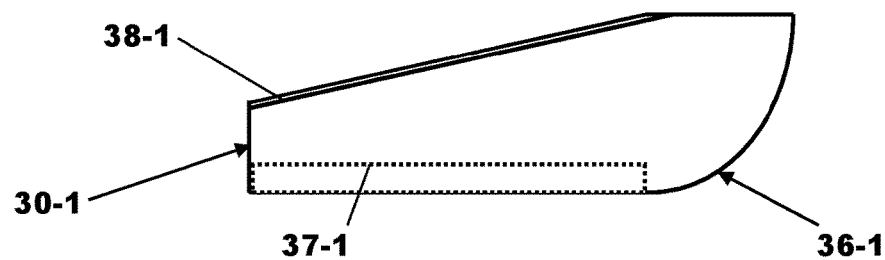
FIG. 19A is a plan view of an alternative top hinge door to the top hinged door shown in FIG. 9.
Figure 19B:
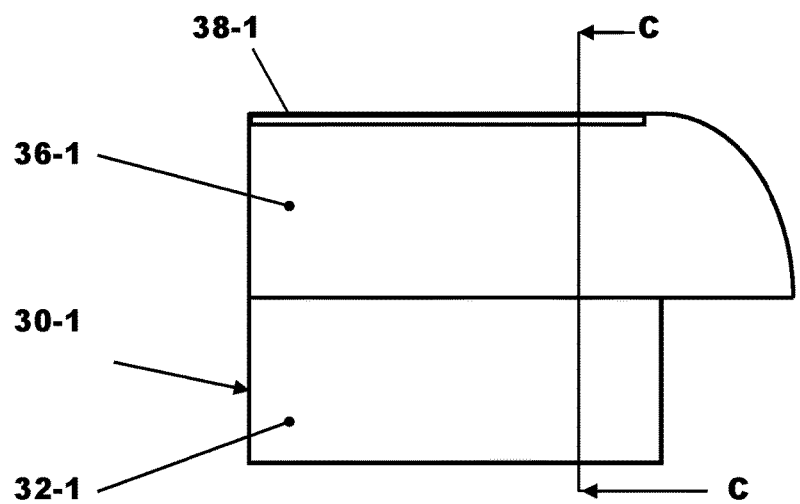
FIG. 19B is a side view of the alternative top hinge door shown in FIG. 19A.
Figure 19C:
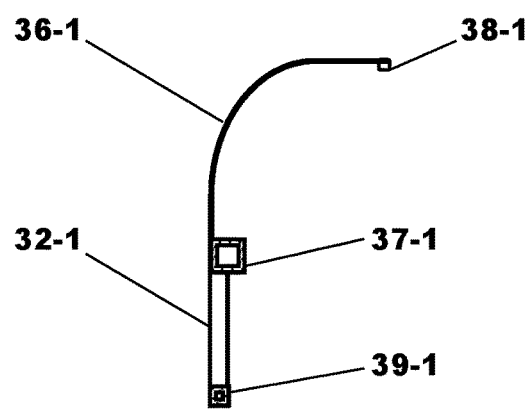
FIG. 19C is a cross-section on the line C-C on FIG. 19B.

With reference to FIGS. 19A to 19C an alternative embodiment is shown of a top hinged door that is intended to be a direct replacement for the top hinged door shown in FIG. 9.

The top hinged door 30-1 includes a wrap around window 36-1 that extends, when the top hinged door 30-1 door is in the closed state from the A-pillar 14 on the first side of the motor vehicle 10 to the B-pillar 16R on the second side of the motor vehicle 10.

The wrap around window 36-1 has fastened thereto along a top inner edge a rail 38-1 that is used to hingedly connect the top hinged door 30-1 along one edge to the diagonal roof member 55 of the vehicle structure by the hinge assembly 51. It will be appreciated that the wrap around window 36-1 includes a windscreen area and a side window area.

The top hinged door 30-1 is therefore hingedly connected by the hinge assembly 51 for rotation about a substantially horizontal pivot axis between a closed state and an open state. The pivot axis is not arranged to lie on a centerline of the motor vehicle 10 but rather is inclined to the longitudinal centerline of the motor vehicle 10 so as to be spaced further away from the second side of the motor vehicle 10 at a front end of the top hinged door 30-1 than it is at a rear end of the top hinged door 30-1.

A lower structural part 32-1 of the top hinged door 30-1 includes an elongate door beam 37-1 extending between and operatively connected when the top hinged door 30-1 is in a closed state to the front and rear structures 60 and 80 so as to transfer side impact loads directly applied to the door beam 37-1 of the top hinged door 30-1 and front impact loads applied via the front structure 60 to the door beam 37-1 into the main vehicle structure 70.

A side rail 39-1 of the top hinged door 30-1 is arranged, when the top hinged door 30-1 is in a closed state to co-operate with a seal fixed to the lower side member 56R of the vehicle structure 50. The side rail 39-1 extends between and is operatively connected to the front and rear structures 60 and 80, when the top hinged door 30-1 is in the closed state.

The main difference between this embodiment and the previous embodiment shown in FIG. 9 is that with this embodiment the wrap around window 36-1 is in the form of a transparent (glass) canopy having no roof panel that is sealingly attached to the rail 38-1 used to hingedly connect the top hinged door 30-1 to the vehicle structure and in particular to the diagonal roof member 55.

One of the advantages of the invention is that the lack of an A-pillar on the second side of the motor vehicle 10 greatly reduces the obstructions in front of the driver thereby providing the driver with an uninterrupted panoramic forward view between the A-pillar 14 and the pseudo B-pillar 35.

A second advantage of the invention is that it facilitates the use of a top hinged door on only one side of the motor vehicle that provides excellent access to a passenger compartment of the motor vehicle 10. The elimination of a conventional header rail (upper longitudinal structural member) on the second side of the motor vehicle 10 made possible by the absence of an A-pillar on the second side of the motor vehicle 10 increases the height of the aperture through which an intended occupant of the motor vehicle 10 must enter the motor vehicle 10.

In addition, the top hinged door 30 is able to extend along a large proportion of the total length of the motor vehicle 10 by providing a very rigid roof structure 40 to support the top hinged door 30 and to resist the loads applied during normal use and those loads applied in crash conditions.

The use of a diagonal hinge for the top hinged door 30 further improves access by moving all of the upper supports for the top hinged door 30 further away from a person entering the motor vehicle 10 than would be the case with a hinge axis arranged to run longitudinally along a centerline of the motor vehicle 10.

With reference to FIGS. 11 to 18, an alternative embodiment of a narrow motor vehicle 110 is illustrated.

The motor vehicle 110 has a single entry door in the form of a side hinged door 118 hingedly connected at a front edge to the main vehicle structure 170 for rotation about a substantially vertical pivot axis on a first side of the motor vehicle 110.

The motor vehicle 110 has a floor 107 and a roof 112 connected to a lower main part of the motor vehicle 110. The floor 107 is connected to a number of upwardly extending pillars 114, 116L, 116R, 117L, 117R and a pair of upright structural members 166L, 166R forming part of a vehicle structure 150 of the motor vehicle 110.

The upwardly extending pillars comprise a single A-pillar 114, a pair of B-pillars 116L, 116R and a pair of C-pillars 117L, 117R.

The motor vehicle 110 has no door on a second side of the motor vehicle 110 only a continuous lower body panel 132 but has the single entry side hinged door 118 located on the first side of the motor vehicle 110. The first side of the motor vehicle 110 is a left hand side and the second side of the motor vehicle 110 is a right hand side. Alternatively, the first side of the motor vehicle 110 could be the right hand side and the second side of the motor vehicle 110 could be the left hand side. The first side of the motor vehicle 110 is the side of the motor vehicle 110 that includes the single A-pillar 114.

Figure 17:
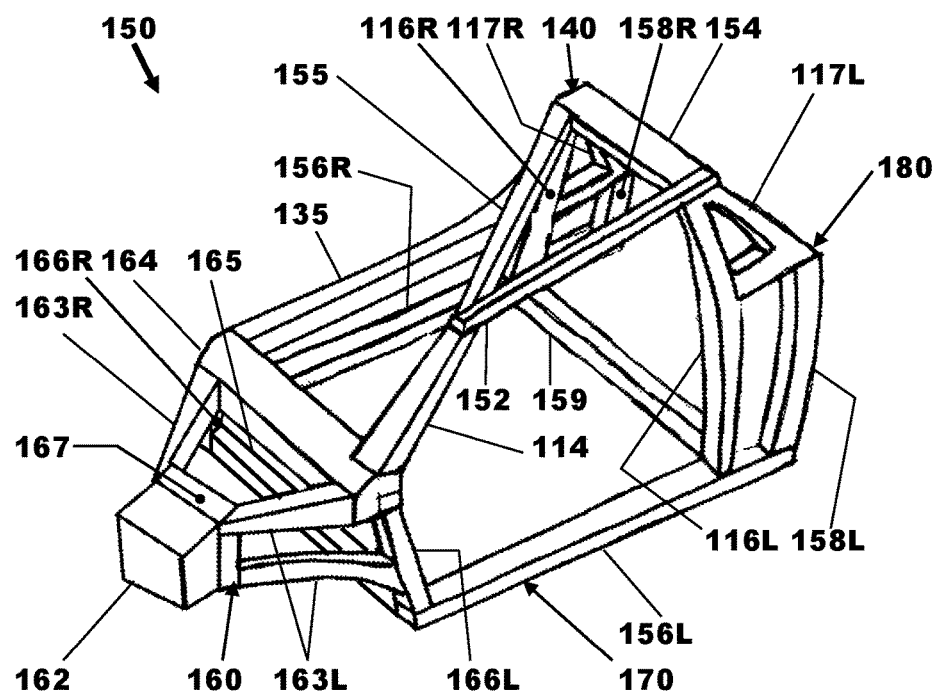
FIG. 17 is a left hand side pictorial view of a vehicle structure for the vehicle shown in FIGS. 11 to 16.
Figure 18:
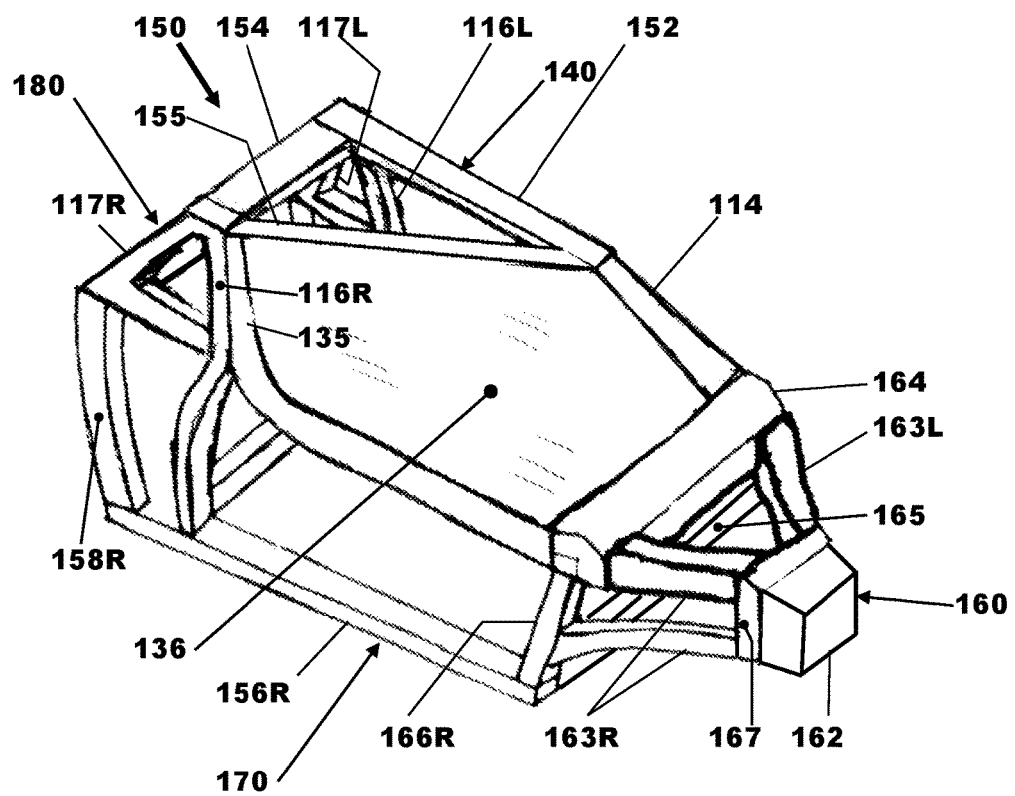
FIG. 18 is a right hand side pictorial view of a vehicle structure for the vehicle shown in FIGS. 11 to 16 showing a wrap around window in position on the vehicle structure.

With particular reference to FIGS. 17 and 18, On a first side of the vehicle structure 150 that corresponds to the first side of the motor vehicle 110, the single A-pillar 114 connects a front end of a roof structure 140 and forms part of the roof 112 of the motor vehicle 110 to a main vehicle structure 170. A first B-pillar 116L connects the roof structure 140 to the main vehicle structure 170 to the rear of the A-pillar 114. An upper longitudinally extending roof member 152 connects the A-pillar 114 to the first B-pillar 116L. On a second side of the vehicle structure 150 that corresponds to the second side of the motor vehicle 110, a second B-pillar 116R connects the roof structure 140 to the main vehicle structure 170 but no A-pillar connects the roof structure 140 to the main vehicle structure 170.

The main vehicle structure 170 includes a front structure 160 connected to a rear structure 180 by at least one longitudinally extending structural member 135, 156L, 156R, on each side of the vehicle structure 150. Lower longitudinally extending structural side members 156L; 156R are provided on both sides of the motor vehicle 110. On the second side of the motor vehicle a single intermediate longitudinally extending structural member 135 is provided.

On the first side of the vehicle structure 150 the lower longitudinally extending structural side member 156L is connected at one end to part of the front structure 160 in the form of an upright structural member 166L and is connected at a rear end to the B-pillar 116L on the first side of the vehicle structure 150.

On the second side of the vehicle structure 150, the lower longitudinally extending structural side member 156R is connected at one end to part of the front structure 160 in the form of a second upright structural member 166R and is connected at a rear end to the B-pillar 116R on the second side of the vehicle structure 150. The intermediate longitudinally extending structural side member 135 is located near a waistline of the motor vehicle 110 and is connected at one end to part of the front structure 160 in the form of a transversely extending upper structural member 164 and is connected at a rear end to the B-pillar 116R on the second side of the vehicle structure 150.

The rear structure 180 is formed in the case of this example by the pair of B-pillars 116L, 116R, the pair of C-pillars 117L, 117R, a pair of rear uprights 158L, 158R and a transverse lower beam 159.

The front structure 160 has at least one deformable member and, in the case of this example, comprises a single front crush can unit 162 to absorb low speed impacts connected at an upper end to a low speed crash can carrier 167 and at a lower end to a lower transverse support (not shown). The front structure also includes a pair of diagonally extending upper and lower front rails 163L, 163R on each side of the vehicle structure 150, the transverse upper structural member 164, a transverse lower member 165 and the pair of structural uprights 166L, 166R one located on each side of the vehicle structure 150.

Each of the lower rails of the pair of diagonally extending rails 163L, 163R is connected a front end thereof to the crash can carrier 167 so as to support a respective side of the crush can unit 162.

The upper rails of the pair of rails 163L, 163R connect an upper end of the crush can unit 162 via the low speed crash can carrier 167 to the transverse upper structural member 164. The lower rails of the pair of rails 163L, 163R connect the crush can unit 162 to a respective one of the pair of structural uprights 166L, 166R. The single front crush can unit 162 is mounted centrally at a front end of the front structure 160 so as to occupy less space and permit turning of the front wheels. The crush can unit 162 transfers load applied to it via the left hand and right hand pairs of upper and lower rails 163L and 163R to the main vehicle structure 170 of the vehicle structure 150.

Figure 13:
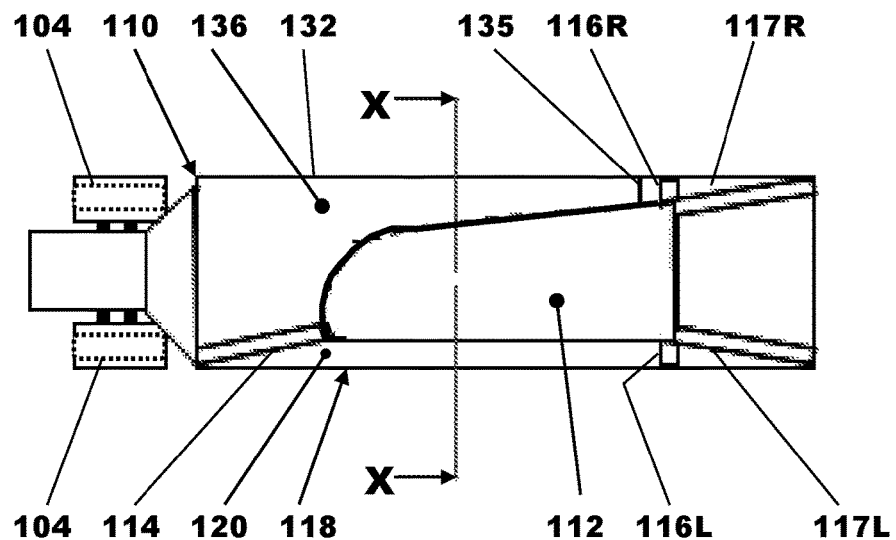
FIG. 13 is a schematic plan view of the narrow motor vehicle shown in FIGS. 11 and 12.
Figure 14:
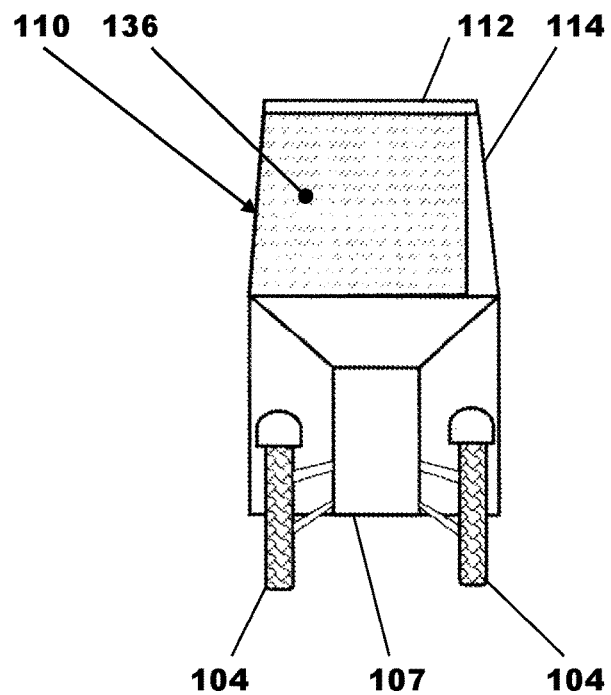
FIG. 14 is a schematic front view of the narrow motor vehicle shown in FIGS. 11 to 13.
Figure 15:
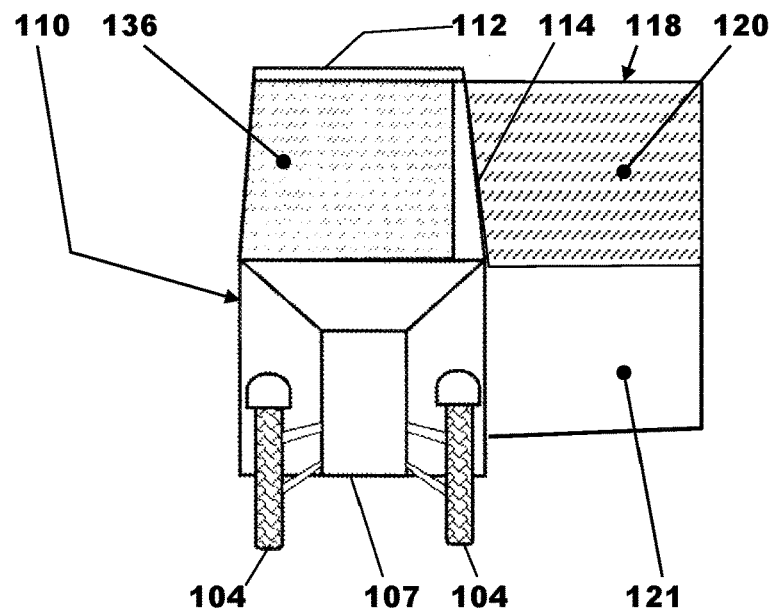
FIG. 15 is a schematic front view of the narrow motor vehicle shown in FIGS. 11 to 13 but showing a side hinged door of the motor vehicle in an open state.
Figure 16:
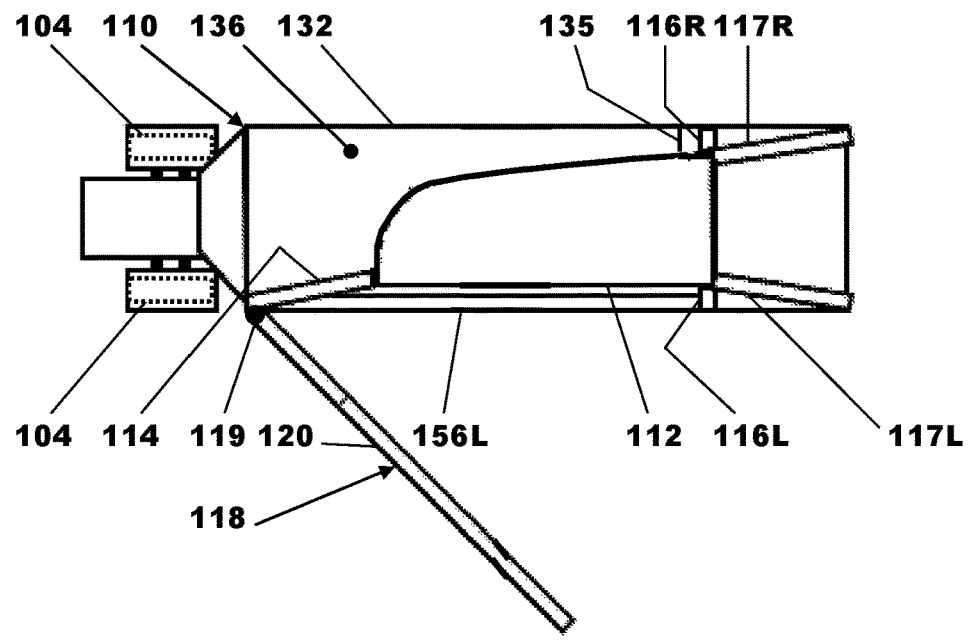
FIG. 16 is a schematic plan view of the narrow motor vehicle shown in FIG. 15.

The roof structure 140 includes a diagonal roof member 155 (the position of which under the roof 112 is shown as dashed lines in FIGS. 13 and 16) connected at one end to an upper end of the A-pillar 114 on the first side of the vehicle structure 150 and connected at a distal end to an upper end of the B-pillar 116R on the second side of the vehicle structure 150. The A-pillar 114 is connected at a lower end to the front structure 160 of the vehicle in the form of the transverse upper structural member 164. The roof structure 140 also includes a longitudinally extending roof member 152 (header rail) connected at a front end to an upper end of the A-pillar 114 and connected towards a rear end to an upper end of the B-pillar 116L on the first side of the vehicle structure 150. A transversely extending roof member 154 is connected at one end to upper ends of the B-pillar 116L and the C-pillar 117L and the longitudinally extending roof member 152 on the first side of the vehicle structure 150 and is connected at a distal end to upper ends of the B-pillar 116R and the C-pillar 117R on the second side of the vehicle structure 150.

The roof structure 140 comprises the diagonal roof member 155, the upper longitudinally extending roof member 152 and the transversely extending roof member 154 connected together to form a structurally rigid triangle.

Frontal impact loads are initially absorbed by the crush can unit 162 and are then transferred via the pairs of upper and lower rails 163L, 163R to the transverse upper structural member 164 and the pair of structural uprights 166L, 166R. In the case of a severe frontal impact the pairs of upper and lower rails 163L, 163R are designed to collapse in a controller manner so as to absorb impact energy.

The triangular roof structure 140 comprised of the longitudinally extending roof member 152, the transversely extending roof member 154 and the diagonal roof member 155. The triangular roof structure forms a strong structural unit able to withstand significant applied loads and to effectively transfer load from the front structure 160 via the A-pillar 114 to the rear structure 180 in such a manner as to make a second A-pillar structurally redundant.

Referring now to FIGS. 11 to 16, the side hinged door 118 is hinged at a front end by means of a pair of spaced apart hinges 119 supported by the upright 166L. However, it will be appreciated that the side hinged door 118 could be hinged at a rear end if so required.

The side hinged door 118 door has a lower structural part 121 to which is mounted a frameless side window 120.

The lower structural part 121 of the side hinged door 118 includes an elongate door beam 137 (shown as a dotted outline in FIG. 11) extending between and operatively connected, when the side hinged door 118 is in a closed state, to the front and rear structures 160 and 180 so as to transfer side impact loads applied to the door beam 137 of the side hinged door 118 into the main vehicle structure 170.

The elongate door beam 137 co-operates when the side hinged door 118 is in a closed state at a rear end with the B-pillar 116L on the first side of the motor vehicle 110 and at a front end with the transversely extending upper structural member 164 of the front structure 160. The connection between the door beam 137 and the B-pillar 116L and transversely extending upper structural member 164 are only made when the side hinged door 118 is in the closed state and do not prevent or hinder movement of the side hinged door 118 to an open state shown in FIGS. 15 and 16.

The motor vehicle 110 includes a wrap around window 136 sealingly secured at one end to the A-pillar 114 on the first side of the motor vehicle 110 and sealingly secured at an opposite end to an upturned end portion of the intermediate longitudinally extending structural side member 135 that forms an upright window frame member for the fixed wrap around window 136. The motor vehicle 110 includes the fixed wrap around window 136 sealingly secured at one end to the A-pillar 114 on the first side of the motor vehicle 110 and sealingly secured at an opposite end to the upright window frame member 135 positioned adjacent the B-pillar 116R on the second side of the motor vehicle 110.

Although not shown in the figures, the wrap around window 136 includes a small openable portion to allow the driver to access the outside of the motor vehicle 110 for the purpose of paying for parking fees or for taking a ticket from a parking machine. It will be appreciated that the wrap around window includes a windscreen area and a side window area.

In an alternative embodiment, the intermediate longitudinally extending structural side member 135 is wholly located behind the continuous lower body panel 132 on the second side of the motor vehicle 110, the wrap around window 136 is sealingly secured at one end to the A-pillar 114 on the first side of the motor vehicle 110, and is sealingly secured at an opposite end to the B-pillar 116R.

In either case, an upper edge of the wrap around window 136 is sealing secured to part of the structure of the roof 112 of the motor vehicle 110 and a lower edge of the wrap around window 136 is sealingly secured to structural members 135, 164 defining a lower edge of a window aperture in which the wrap around window 136 is sealingly secured. The roof 112 includes a peripheral stiffening member (not shown) attached at one end to an upper end of the A-pillar 114 and attached at an opposite end to the upturned end of the intermediate longitudinally extending structural side member 135 that forms an upright window frame member. The wrap around window 136 is sealingly secured to the roof 112 via the peripheral stiffening member but alternative sealing arrangements could be used.

One of the advantages of this embodiment is that the lack of an A-pillar on the second side of the motor vehicle 110 greatly reduces the obstructions in front of the driver thereby providing the driver with a virtually uninterrupted panoramic forward view.

It will be appreciated that an asymmetric vehicle structure is arranged so that there is always just one upper longitudinally extending roof member 52, 152 and one intermediate longitudinal member 57, 135 on one side of the motor vehicle.

The first embodiment has the top hinged door 30, the upper longitudinally extending roof member 52 and the intermediate longitudinal member 57 are on the first side of the motor vehicle 10. The second embodiment has a side hinged door 118 on the opposite side of the motor vehicle 110. The upper longitudinally extending roof member 152 is on the first side and the intermediate longitudinal member 135 is on the second side of the motor vehicle 110.

The vehicle structures 50, 150 as shown and described above are constructed from a number of aluminium alloy structural members that are fastened together to form the respective vehicle structure 50, 150. It will be appreciated that welding or adhesive bonding can be used to fasten the structural members together or a combination of adhesive bonding and welding.

It will be further appreciated that some or all of the structural members could be replaced by composite components made from, for example, a carbon fibre reinforced plastic material or the vehicle structure could be in the form of a unibody structure made of stamped panels.

The specific structure used is not as important as the arrangement of a structure designed to have sufficient strength and torsional rigidity to permit the deletion of one of the A-pillars so that there is only a single A-pillar rather than two as found on a conventional motor vehicle.

It will be appreciated by those skilled in the art that although this disclosure is described by way of example with reference to one or more embodiments it is not limited to the disclosed embodiments and that alternative embodiments could be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the scope of the invention. Additionally, the features of various implementing embodiments may be combined to form further embodiments of the invention.

What is claimed is:

1. A motor vehicle comprising:
   a body; and
   a roof connected to the body by an A-pillar connecting a front end of the roof to the body and a first B-pillar extending between the roof, the body, and the A-pillar on a first side of the body, a second B-pillar connecting the roof to the body, and wherein no A-pillar connects the roof to the body on a second side of the body, wherein the roof includes a diagonal roof member connected at one end to an upper end of the A-pillar on the first side of the body and connected at an opposite end to an upper end of the second B-pillar on the second side of the body.

2. A motor vehicle of claim 1 wherein the roof includes an upper longitudinally extending roof member connected at a front end to an upper end of the A-pillar on the first side of the body and connected on a rear end to an upper end of the first B-pillar on the first side of the body.

3. A motor vehicle of claim 1 wherein the roof includes a transversely extending roof member connected at one end to an upper end of first the B-pillar on the first side of the body and connected at an opposite end to an upper end of the second B-pillar on the second side of the body.

4. A motor vehicle comprising:
   a body; and
   a roof connected to the body by an A-pillar connecting a front end of the roof to the body and a first B-pillar extending between the roof, the body, and the A-pillar on a first side of the body, a second B-pillar connecting the roof to the body, and wherein no A-pillar connects the roof to the body on a second side of the body, wherein the body includes a front structure having a single front crush can unit mounted centrally at a front end of the front structure.

5. A motor vehicle of claim 4 wherein the A-pillar on the first side of the body is connected at a lower end to the front structure of the body.

6. A motor vehicle of claim 4 wherein the body includes a rear structure.

7. A motor vehicle of claim 6 wherein the first and second B-pillars on the first and second sides of the body are part of the rear structure.

8. A motor vehicle comprising:
   a body; and
   a roof connected to the body by an A-pillar connecting a front end of the roof to the body and a first B-pillar extending between the roof, the body, and the A-pillar on a first side of the body, a second B-pillar connecting the roof to the body, and wherein no A-pillar connects the roof to the body on a second side of the body wherein on the first side of the body an intermediate longitudinal side member is connected to a front structure at a front end to part of the front structure and is connected to a rear structure at a rear end to the first B-pillar on the first side of the body, and wherein a lower longitudinal side member is connected at a front end to part of the front structure and is connected at a rear end to the first B-pillar on the first side of the body.

9. A motor vehicle of claim 8 wherein on the second side of the body there is a lower longitudinal side member connected at one end to part of the front structure and connected at a rear end to the second B-pillar on the second side of the body; and wherein there is no intermediate longitudinal side member.

10. A motor vehicle of claim 8 wherein on the first side of the body there is a lower longitudinal side member connected at one end to part of the front structure and connected at a rear end to the first B-pillar on the first side of the body, and wherein there is no intermediate longitudinal side member.

11. A motor vehicle comprising:
    a body; and
    a roof connected to the body by an A-pillar connecting a front end of the roof to the body and a first B-pillar extending between the roof, the body, and the A-pillar on a first side of the body, a second B-pillar connecting the roof to the body, and wherein no A-pillar connects the roof to the body on a second side of the body, wherein on the second side of the body there is an intermediate longitudinal side member connected at one end to part of a front structure and connected at a rear end to the second B-pillar on the second side of the body and a lower longitudinal side member connected at one end to part of the front structure and connected to a rear structure at a rear end to the second B-pillar on the second side of the body.

12. A motor vehicle comprising:
    a body; and
    a roof connected to the body by an A-pillar connecting a front end of the roof to the body and a first B-pillar extending between the roof, the body, and the A-pillar on a first side of the body, a second B-pillar connecting the roof to the body, and wherein no A-pillar connects the roof to the body on a second side of the body, and wherein the first side of the body is on a first side of the motor vehicle and the second side of the body is on a second side of the motor vehicle, wherein the motor vehicle accommodates no more than one person per row of seating and has a single entry door on one of the first and second sides and no door on an opposite one of the first and second sides.

13. A motor vehicle of claim 12 wherein the single entry door is a top hinged door located on the second side of the motor vehicle.

14. A motor vehicle of claim 13 wherein the roof includes a diagonal roof member connected at one end to an upper end of the A-pillar on the first side of the body and connected at a distal end to an upper end of the second B-pillar on the second side of the body; and wherein the top hinged door is connected by a hinge along one edge to the diagonal roof member for rotation about a substantially horizontal pivot axis.

15. A motor vehicle of claim 13 wherein the top hinged door includes a lower structural part and the lower structural part of the top hinged door includes an elongate door beam to transfer impact loads applied to the elongate door beam into the body when the top hinged door is in a closed state.

16. A motor vehicle of claim 14 wherein the top hinged door includes a wraparound window that extends from the A-pillar on the first side of the motor vehicle to the second B-pillar on the second side of the motor vehicle when the door is in a closed state.

17. A motor vehicle of claim 16 wherein the wraparound window is fastened along a top edge to a wedge-shaped roof connected by a hinge along one edge to the diagonal roof member.

18. A motor vehicle of claim 14 wherein the top hinged door includes a wraparound window that extends when the door is in a closed state from a position adjacent the A-pillar on the first side of the motor vehicle to a position substantially adjacent the second B-pillar on the second side of the motor vehicle and onto a top of the motor vehicle to a position adjacent the diagonal roof member to which the top hinged door is connected by a hinge.

19. A motor vehicle of claim 12 wherein the single-entry door is a side hinged door connected by a hinge at one edge to the body for rotation about a substantially vertical pivot axis on the first side of the motor vehicle.

20. A motor vehicle of claim 19 wherein a lower structural part of the side hinged door includes an elongate door beam to transfer impact loads applied to the elongate door beam of the side hinged door into the body when the side hinged door is in a closed state.

21. A motor vehicle of claim 19 wherein the motor vehicle includes a fixed wraparound window secured at one end to the A-pillar on the first side of the motor vehicle and secured at an opposite end to one of an upright window frame positioned adjacent the second B-pillar on the second side of the motor vehicle.

22. A motor vehicle of claim 21 wherein an upper edge of the fixed wraparound window is secured to part of a roof of the motor vehicle and a lower edge of the wrap-around window is secured to structural members defining a lower edge of a window aperture in which the wrap around window is secured.

* * * * *